(12) United States Patent
Hauber et al.

(10) Patent No.: US 12,431,774 B2
(45) Date of Patent: Sep. 30, 2025

(54) COMPOSITE STATOR SLEEVE

(71) Applicant: Trelleborg Sealing Solutions Albany, Inc., Niskayuna, NY (US)

(72) Inventors: David Edgar Hauber, Troy, NY (US); Graham Ostrander, Clifton Park, NY (US); Timothy Miller, Thornton, CO (US)

(73) Assignee: Trelleborg Sealing Solutions Albany, Inc., Niskayuna, NY (US)

( * ) Notice: Subject to any disclaimer, the term of this patent is extended or adjusted under 35 U.S.C. 154(b) by 321 days.

(21) Appl. No.: 18/201,037

(22) Filed: May 23, 2023

(65) Prior Publication Data

US 2023/0387768 A1 Nov. 30, 2023

Related U.S. Application Data

(60) Provisional application No. 63/365,308, filed on May 25, 2022.

(51) Int. Cl.
*H02K 15/14* (2025.01)
*B29C 65/00* (2006.01)
(Continued)

(52) U.S. Cl.
CPC ......... *H02K 15/14* (2013.01); *B29C 66/0224* (2013.01); *B29C 70/382* (2013.01);
(Continued)

(58) Field of Classification Search
CPC ............ B29C 70/382; B29C 65/02–38; B29C 65/74–749; B29C 66/0224
See application file for complete search history.

(56) References Cited

U.S. PATENT DOCUMENTS 6,432,236 B1 * 8/2002 Leemon .............. B29C 66/9513
156/308.2
8,378,550 B2 2/2013 Bradfield
(Continued)

FOREIGN PATENT DOCUMENTS

CN 102990923 A 3/2013
CN 108390510 A 8/2018
(Continued)

OTHER PUBLICATIONS

Shouzheng, Sun, etc. Design of Robotic Fiber Placement Machine and Process Optimization for Thermoplastic Composites [J]. Journal of Mechanical Engineering, 2021, 57(23): 209-219.
(Continued)

*Primary Examiner* — Atul P. Khare
(74) *Attorney, Agent, or Firm* — Orbit IP, LLP; Marc G. Martino

(57) ABSTRACT

A method of manufacturing a stator sleeve starts with wrapping a cylindrical mandrel with a heated prepreg tape using automated fiber placement. The prepreg tape has a continuous fiber reinforcement within a polymer matrix. Next, cool and remove the cylindrical mandrel from the wrapped prepreg tape resulting in an unfinished cylindrically shaped stator sleeve. Each end of the unfinished stator sleeve is trimmed. Next, abut a first and a second end ring respectively against a first and a second ends of the trimmed stator sleeve using a cylindrical fixture tool. The first and second end rings are the same material as the polymer matrix of the prepreg tape. Finally, laser welding or melt bonding the first and second rings to the first and second ends of the trimmed stator sleeve.

19 Claims, 14 Drawing Sheets

(51) Int. Cl.
*B29C 70/38* (2006.01)
*H02K 9/197* (2006.01)
*H02K 15/12* (2006.01)
*H02K 9/19* (2006.01)

(52) U.S. Cl.
CPC ............ *H02K 9/197* (2013.01); *H02K 15/12* (2013.01); *H02K 2215/00* (2021.08)

(56) References Cited

U.S. PATENT DOCUMENTS

| | | |
|---|---|---|
| 10,784,738 B2 | 9/2020 | Berendes et al. |
| 10,800,113 B2 | 10/2020 | Hauber et al. |
| 10,985,624 B2 | 4/2021 | Berendes et al. |
| 2003/0193260 A1 | 10/2003 | Reiter, Jr. et al. |
| 2014/0054992 A1 | 2/2014 | Hasegawa et al. |
| 2020/0043651 A1 | 2/2020 | Fukumoto et al. |
| 2020/0247035 A1 | 8/2020 | Hauber |
| 2022/0200423 A1* | 6/2022 | Woolmer ............... H02K 21/24 |

FOREIGN PATENT DOCUMENTS

| | | | | |
|---|---|---|---|---|
| CN | 109904961 A | | 6/2019 | |
| CN | 110784079 A | | 2/2020 | |
| CN | 214205295 U | * | 9/2021 | ............. H02K 1/165 |
| DE | 10 2020 117 314 A1 | | 1/2022 | |
| DE | 10 2020 119 110 A1 | | 1/2022 | |
| DE | 10 2020 126 408 A1 | | 4/2022 | |
| JP | S53-34870 A | | 3/1978 | |
| WO | WO-2020021030 A1 | * | 1/2020 | ........... B29C 70/222 |

OTHER PUBLICATIONS

Jiqiang, Hu, etc. Fabrication of Thermoplastic Composite Components and Their Application in Aerospace [J]. Astronautical Systems Engineering Technology, 2020(4): 61-70.

* cited by examiner

COMPOSITE STATOR SLEEVE

CROSS-REFERENCE TO RELATED APPLICATIONS

This non-provisional application claims priority to provisional application 63/365,308 filed on May 25, 2022, the entire contents of which are fully incorporated herein with these references.

DESCRIPTION

Field of the Invention

The present invention generally relates to stator sleeves used in electric motors. More particularly, the present invention relates to the method of manufacturing a composite stator sleeve used in high-performance electric motors with liquid cooled stators.

Background of the Invention

Generally speaking, an electric motor has several critical components that enable it to efficiently and effectively convert electrical energy into mechanical energy. Each one helps drive the critical interaction between the motor's magnetic field and the electric current in its wire winding to generate force in the form of shaft rotation. It is the mechanical energy produced by this shaft rotation that helps keep electric cars in motion or a plant's operations up and running smoothly. These components may include a rotor, a stator, bearings, windings and an air gap.

The Rotor: The rotor is the moving part of your electric motor. It turns the shaft that delivers the mechanical power mentioned above. In a typical configuration, the rotor has conductors laid into it that carry currents which then interact with the magnetic field of the stator to generate the forces that turn the shaft. Having said that, some rotors carry permanent magnets and it is the stator that holds the conductors.

The Stator and Stator Core: The stator is the stationary part of your motor's electromagnetic circuit and usually consists of either windings or permanent magnets. The stator core is made up of many thin metal sheets, called laminations. Laminations are used to reduce energy losses that would result if a solid core were used.

The Bearings: The rotor in your electric motor is supported by bearings, which allow it to turn on its axis. These bearings are in turn supported by the motor housing. The motor shaft extends through the bearings to the outside of the motor, where the load is applied. Because the forces of the load are exerted beyond the outermost bearing, the load is said to be "overhung."

The Windings: Windings are wires that are laid in coils, usually wrapped around a laminated soft iron magnetic core so as to form magnetic poles when energized with current. Electric motors come in two basic magnet field pole configurations: salient-pole and non-salient-pole. In the salient-pole motor, the pole's magnetic field is produced by a winding wound around the pole below the pole face. In the non-salient-pole motor, the winding is distributed in pole face slots.

The Air Gap: Although not a physical component, the air gap is the distance between the rotor and stator. The motor's air gap has important effects, and is generally as small as possible, as a large gap has a strong negative effect on performance. It is the main source of the low power factor at which motors operate. Because the magnetizing current increases with the air gap, your air gap should be minimal. Having said that, very small gaps may pose mechanical interference problems.

High-performance electric motors may generate a lot of heat, especially in the conductors. Therefore, many high-performance electric motors are configured where the rotors carry the permanent magnets and the stator holds the conductors. Liquid cooling can then be used to directly cool the conductors resulting in a liquid cooled stator. A stator sleeve can be used to separate the stator from the rotor enabling the use of fluid coolants. Such liquid cooled motors can be used for applications such as E-mobility where high efficiency and power to weight ratio is important. Applicable inner rotor/outer stator motors include, but are not limited to, induction motors (IM), internal permanent magnet motors (IPM), Synchronous Reluctance Motors (SynRM), and IPM-SynRM motors. Additionally, outer rotor/inner stator motors such as in-wheel motors can benefit from the present invention.

Stator sleeves are known within the state of the art. For example, US 2003/0193260 teaches a powder metal stator sleeve. Metal stator sleeves are not desirable due to electrical conductivity and the resultant eddy current losses that reduce motor efficiency.

U.S. Pat. No. 8,378,550 B2 teaches a stator sleeve that is external to the stator windings, rather than between the stator and rotor as in the present invention. Such coolant means is not as efficient as immersing the stator windings in coolant as in the present invention.

Application DE102020119110A1 teaches a stator sleeve that attempts to address cooling of high-performance electric motors. However, the present application improves upon this teaching in many ways as is discussed further below.

The purpose of a stator sleeve is to create a barrier between the stator and the rotor in an electric motor to allow coolant to flow through the stator to cool, resulting in increased motor efficiency. Accordingly, there is a need for an improved stator sleeve that enables improved high-performance electric motors. The present invention fulfills these needs and provides other related advantages.

SUMMARY OF THE INVENTION

An exemplary embodiment of the present invention is a method of manufacturing a stator sleeve, where the stator sleeve is configured to be assembled as part of a cooled electrical motor having a stator with a stationary conductor with winding and a rotor with a rotating permanent magnet, and where a coolant liquid is configured to cool the stationary conductor with winding. The method of manufacturing the stator sleeve comprises the steps of: providing a cylindrical mandrel; wrapping the cylindrical mandrel with a prepreg tape using automated fiber placement, the automated fiber placement being an in-situ consolidation; wherein the prepreg tape comprises a continuous fiber reinforcement within a polymer matrix; heating the prepreg tape during the automated fiber placement; cooling the wrapped prepreg tape by waiting an elapsed time; removing the cylindrical mandrel from the wrapped prepreg tape resulting in an unfinished cylindrically-shaped stator sleeve; trimming each end of the unfinished stator sleeve resulting in a trimmed stator sleeve having a first end opposite a second end; providing a first end ring and a second end ring, wherein the first and second end rings comprise a polymer; wherein the polymer of the first and second end rings are the same material as the polymer matrix of the prepreg tape;

abutting the first and second end rings respectively against the first and second ends of the trimmed stator sleeve using a cylindrical fixture tool; and laser welding or melt bonding the first and second rings respectively to the first and second ends of the trimmed stator sleeve, thereby forming a completed stator sleeve configured for installation in the cooled electrical motor.

Alternative embodiments are now described. The prepreg tape wrapping of the continuous fiber reinforcement may be in a hoop-wrap orientation. The continuous fiber reinforcement may comprise S2 glass, IM7 carbon and/or boron. The polymer matrix may comprise PA, PET, PBT, POM, PPS, PEEK, PAEK and/or PEKK.

The heating of the prepreg tape during the automated fiber placement may comprise hot gas torch convection heating, laser heating, flash lamp heating or infrared heating.

The first and second end rings may comprise a carbon black filled polymer.

The stator sleeve may be impermeable to coolant liquid.

The prepreg tape may be unidirectional.

The step of removing the cylindrical mandrel from the wrapped prepreg tape may comprise cooling the cylindrical mandrel allowing it to contract and shrink in size. The cooling of the cylindrical mandrel may comprise flowing a cooled liquid through the cylindrical mandrel.

The step of removing the cylindrical mandrel from the wrapped prepreg tape may comprise dissolving the cylindrical mandrel in a liquid configured to dissolve the material of the cylindrical mandrel.

The step of removing the cylindrical mandrel from the wrapped prepreg tape may comprise collapsing the cylindrical mandrel.

An exemplary embodiment of the present invention is a method of manufacturing a stator sleeve, where the stator sleeve is configured to be assembled as part of a cooled electrical motor having a stator with a stationary conductor with winding and a rotor with a rotating permanent magnet, and where a coolant liquid is configured to cool the stationary conductor with winding. The method of manufacturing the stator sleeve comprises the steps of: providing a cylindrical mandrel; wrapping the cylindrical mandrel with a prepreg tape using automated fiber placement; wherein the prepreg tape comprises a continuous fiber reinforcement within a polymer matrix; heating the prepreg tape during the automated fiber placement; cooling the wrapped prepreg tape by waiting an elapsed time; removing the cylindrical mandrel from the wrapped prepreg tape resulting in an unfinished cylindrically-shaped stator sleeve; wherein the unfinished cylindrically-shaped stator sleeve is not fully consolidated; providing an outer mold defining an outside surface of a finished state sleeve; placing the unfinished cylindrically-shaped stator sleeve; inserting a conformable bladder into the composite sleeve; pressurizing the conformable bladder; heating an assembly, the assembly comprising the outer mold, the unfinished cylindrically-shaped stator sleeve and the conformable bladder, wherein the unfinished stator sleeve is fully consolidated resulting in an unfinished stator sleeve; cooling the assembly; removing the unfinished stator sleeve from the outer mold and removing the conformable bladder; trimming each end of the unfinished stator sleeve resulting in a trimmed stator sleeve having a first end opposite a second end; providing a first end ring and a second end ring, wherein the first and second end rings comprise a polymer; wherein the polymer of the first and second end rings are the same material as the polymer matrix of the prepreg tape; abutting the first and second end rings respectively against the first and second ends of the trimmed stator sleeve using a cylindrical fixture tool; and laser welding or melt bonding the first and second rings respectively to the first and second ends of the trimmed stator sleeve, thereby forming a completed stator sleeve configured for installation in the cooled electrical motor.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
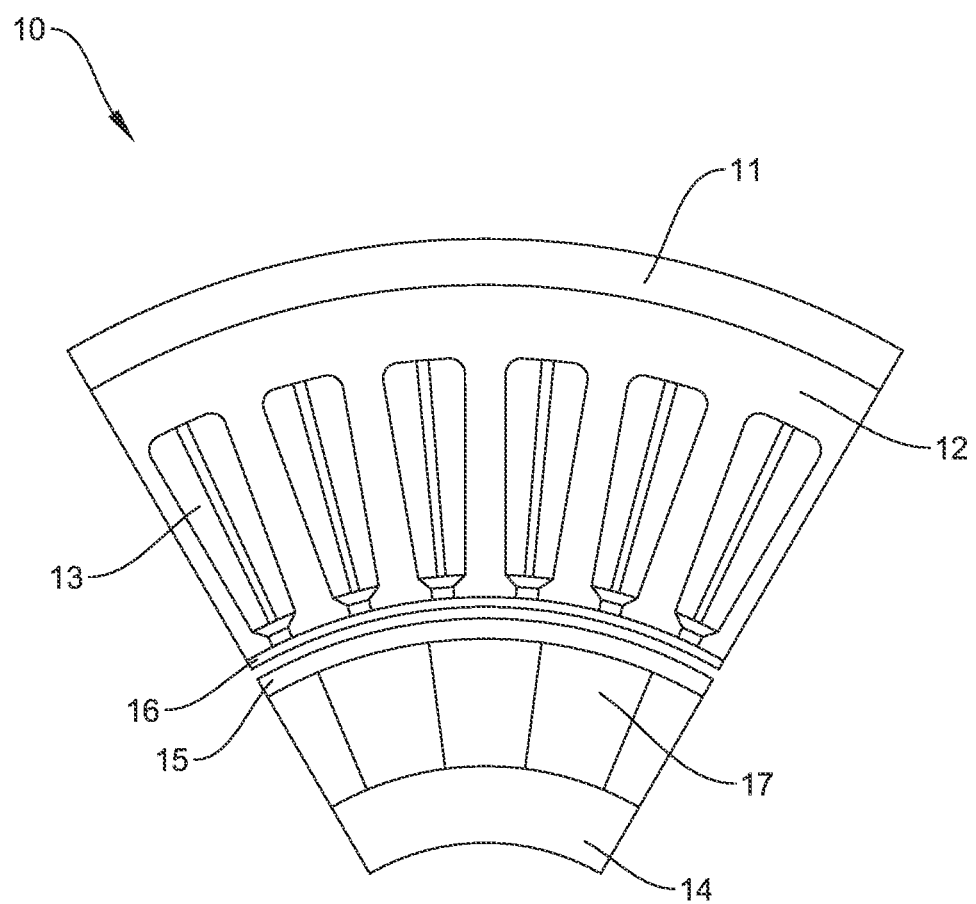
FIG. 1 illustrates a sectional view of an electric motor.

Composites have earned their way onto commercial aircraft, literally step by step. At each stage, they've proven themselves capable of forming increasingly flight-critical parts with the required strength, stiffness and near absence of flaws (surface porosity and unseen internal voids) that could be the source of future damage as aircraft age. Until comparatively recently, that near void-free standard (<1% porosity) was maintained by a combination of vacuum bag consolidation and, typically, many hours of exposure to high heat and pressure in an autoclave during the curing process. In recent years, development of oven-curable resins (systems that can be consolidated to acceptable void contents without an autoclave) have helped to shorten cure cycles and, because ovens cost less to operate than autoclaves, to reduce both the time and expense required to produce parts. In parallel, automated filament winding, automated tape laying (ATL) and automated fiber placement (AFP) equipment have replaced hand layup in many applications, radically increasing the speed at which parts can be laminated. Although these systems are equipped with rollers that compress the material immediately after placement to ensure adhesion and avoid formation of air pockets that would create voids, consolidation of the laminate still typically occurs in the second step of what remains a two-step process, under a vacuum bag, in an autoclave, oven or other heating device, such as a heated tool. This state of the art persists, at least in part, because today's certified aerocomposite materials are predominately thermoset-based.

There is an alternative. Known as in-situ consolidation, it means, consolidation in place. The key is the use of thermoplastic rather than thermoset matrices. Thermoplastic materials are liquid when heated to melt temperature and solidify when cooled, but do not need to crosslink like thermosets. Consolidation of a thermoplastic composite (TPC), then, can be accomplished by quickly heating the impregnated reinforcement to the melt temperature of the thermoplastic polymer matrix and then applying pressure as the tape or tows are placed onto a tool and/or a previously placed laminate. True in-situ consolidation (ISC) is a one-step process—no further heating or pressure steps are required after fiber placement or tape laying is completed.

The implications of eliminating an entire and expensive step in the manufacturing process are so significant and obvious that one might ask, why isn't everyone already doing it? For one (there are other reasons, to be discussed), the aerospace industry pays a very steep price for change. Materials substitutions inevitably require extensive and costly testing and recertification.

That said, two-step consolidated TPCs are already in use in select aircraft applications. Although their processing temperatures are much higher than thermosets—closer to 400° C. vs. 180° C./350° F. for primary structures—their cycle times are much shorter because TPCs require only cooling rather than crosslinking. Thermoplastics also are inherently tough and need no special formulation to provide the fatigue-resistance necessary for aircraft applications. Further, because thermoplastics can be reheated and reformed, they can be welded (a cost-saving, fastener-free assembly option). As the aircraft industry pursues materials and processing options that will enable production rates of at least 60 aircraft/month and support the envisioned digital manufacturing, multifunctional structures and sustainability that are deemed necessary for next-generation aircraft, TPCs have emerged as frontrunners. In an impressive percentage of recently completed, large-scale aircraft demonstration projects, TPCs have been the material of choice.

The inventors of the present invention have much experience in the aerospace industry and understand the automation of the manufacturing process for thermoplastics by automated tape placement (ATP) can achieve an increased production rate, reduction in labor cost and improved geometric repeatability when compared to conventional hand layup. The inventors have now turned their attention to improving the electrical motor which is used in a wide range of high-performance applications.

The present invention improves upon the prior art by the following: incorporating end features to facilitate connection to the stator, fluid sealing, and ease of assembly; optionally incorporating axial features on the outer diameter for ease of assembly, coolant flow channels, stator winding spacers, and stiffening members; employing thermoplastic polymer composites to allow the entire structure to be cobonded together, provide superior coolant/solvent resistance, allow high-rate manufacturing, allow recycling at end of life; providing innovative manufacturing methods to facilitate manufacturing of an optimized stator sleeve; and manufacturing a complex stator sleeve assembly efficiently at high rates.

As previously mentioned, the purpose of the stator sleeve is to create a barrier between the stator and the rotor in an electric motor to allow coolant to flow through the stator for cooling. A general configuration is shown in FIG. 1, which is an enlarged sectional view of a representation of an internal permanent magnet motors (IPM) motor. FIG. 1 illustrates a sectional view of an electric motor 10 having an outside housing 11, a stator 12, a winding 13, a rotor 14, a rotor sleeve 15, a stator sleeve 16 and a permanent magnet 17. It is understood that some electric motors may include a stator sleeve but not have a rotor sleeve.

The stator sleeve 16 of the present invention is ideally made as a thin wall. This results in a smaller gap between the stator and rotor which improves efficiency. The stator sleeve has high strength and stiffness. This allows a thinner wall and minimum deformation of the sleeve under use. The stator sleeve has no permeability to coolant, thus fluid leaks through the material of the stator sleeve will not become a problem. The stator sleeve has low magnetic permeability, which then does not disturb the magnetic field between the rotor and stator. The stator sleeve also has low electrical conductivity, which leads to low electrical loss due to eddy currents. The stator sleeve incorporates features such as: end fittings for connecting to the stator and sealing purposes; structures for coolant flow channels, stiffening, integration with stator windings, etc.; and mounting structures for ease of assembly, alignment, etc.

It is understood by those skilled in the art reading this disclosure that the liquid permeability of the stator of the present invention is zero, as any leakage of coolant would result in failure of the motor.

Furthermore, the carbon fibers, glass fibers and/or the polymer composites of the present invention do not contribute to magnetic losses in the electric motor. More specifically, glass fibers such as S2 glass are excellent electrical insulators as are polymers and do not contribute to electrical losses in electric motors. Carbon fibers are electrically conductive along the length of the fiber (on the order of 2 to 20 micro ohm-m). However, continuous carbon fiber composites as used in the present invention are insulated from each other by the polymer matrix resulting in no conductive paths for eddy current losses.

The present invention involves innovative materials and manufacturing methods to improve the state of the art for stator sleeves. The basic approach is to use advanced thermoplastic composite materials with innovative manufacturing methods to manufacture the improved stator structure.

A general approach of the present invention is to first manufacture the tube body using a process such as automated fiber placement (AFP), which can be in-situ consolidation (ISC), to produce the structure for the cylindrical sleeve. Then, one can incorporate any additional features such as end fittings and/or axial structures.

The present invention starts with making a composite sleeve. Continuous fiber reinforcements such as S2 glass, IM7 carbon, boron or any other suitable fiber may be employed. Higher strength and stiffness of continuous fibers are preferred. A polymer matrix is employed to hold the fibers in place in the stator sleeve, protect the fibers, transfer structural loads between fibers, and prevent permeation of the coolant. Thermoplastic polymers are preferred due to the ability to thermally co-bond to other features, coolant resistance, and recyclability. Suitable polymers include but are not limited to PA, PET, PBT, POM, PPS, PEEK, PAEK, PEKK depending on the use temperature and other factors.

Figure 2A:
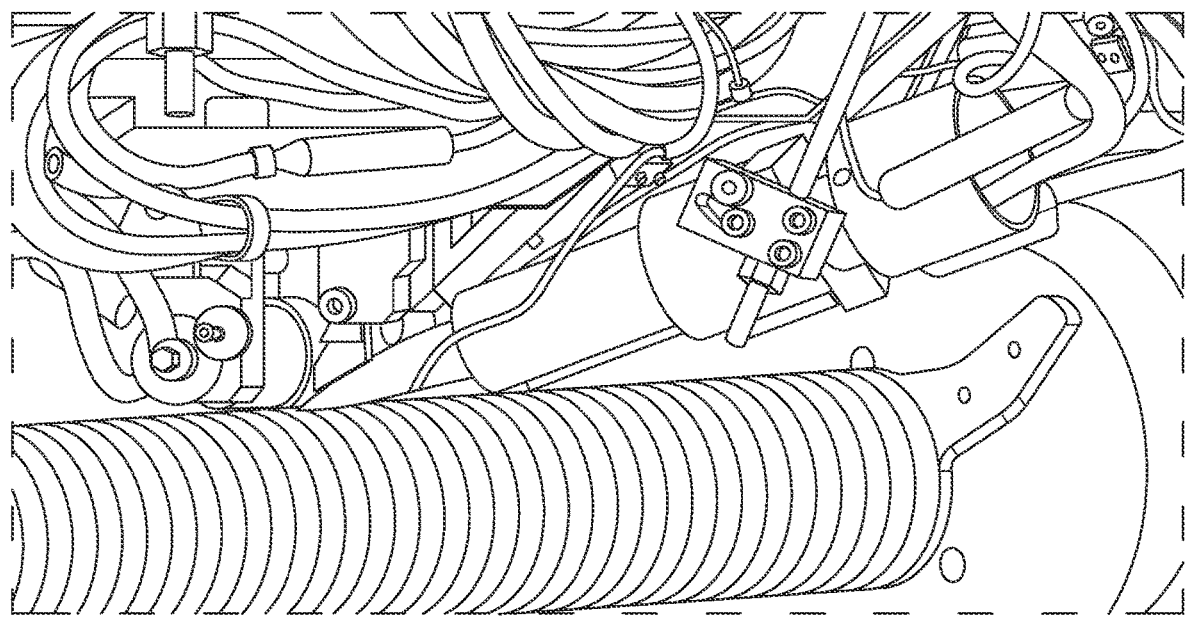
FIG. 2A is an illustration of an in-situ consolidation (ISC) process.
Figure 2B:
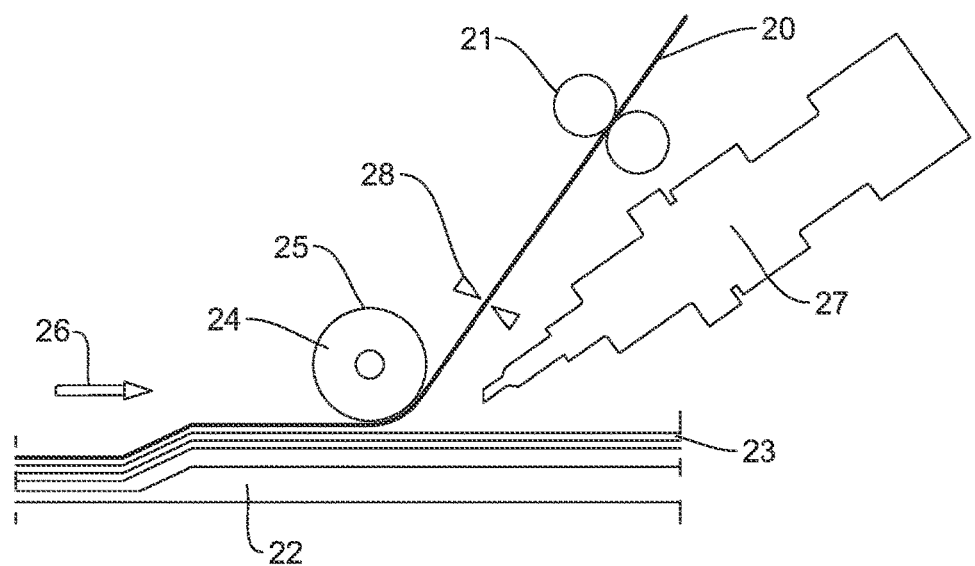
FIG. 2B is a simplified side view similar to the illustration of FIG. 2A showing an in-situ consolidation process.

FIG. 2A is a picture of an in-situ consolidation (ISC) process. FIG. 2B is a simplified side view similar to the illustration of FIG. 2A showing an in-situ consolidation process. The incoming tape 20 is first directed between one or a multitude of tape feed roller 21. The tape is ultimately laid down upon a tool 22 where a multitude of plies 23 are disposed. As the tape is directed through the feed rollers, it finally is directed onto the tool or onto the previous ply by a roller 24 that applies a force 25 forcing it onto the tool or previous ply. The direction of travel is noted by arrow 26. This means that either the tool is moving one direction, the rollers are moving the other direction or a combination of both. A hot gas torch convection heater 27 is used to heat the prepreg tape 20. Once enough ply layers are laid down, a tape cutter 28 can cut the tape.

Reinforced thermoplastic composites such as, but not limited to S2/PEEK are employed using existing state of the art AFP and ISC technology to manufacture the composite cylinder. Unidirectional composite prepreg tape is preferred along with a primarily hoop-wrap orientation for high compression strength. This means the continuous length of the fiber is around the circumference of the cylinder. The ISC process is shown in FIG. 2A making a cylinder along with a graphic illustration of the process in FIG. 2B. The illustration shows hot gas torch (HGT) heating technology however laser, flash lamp, IR heaters or other suitable heating methods may be employed just as well.

After the composite cylinder is consolidated it is removed from the mandrel and trimmed to the desired length. Removal of the composite sleeve from the mandrel may be facilitated by cooling the mandrel and such cooling may be integrated into the mandrel with the use of refrigerants for example. It is noted that release agents are not typically required for ISC processing unlike in autoclave consolidation where the mandrel is heated with the part. The mandrel never reaches the polymer melt temperature preventing bonding. In the inventor's experience, inexpensive aluminum mandrels are preferred due to high CTE for extraction of the part after cooling.

Figure 3:
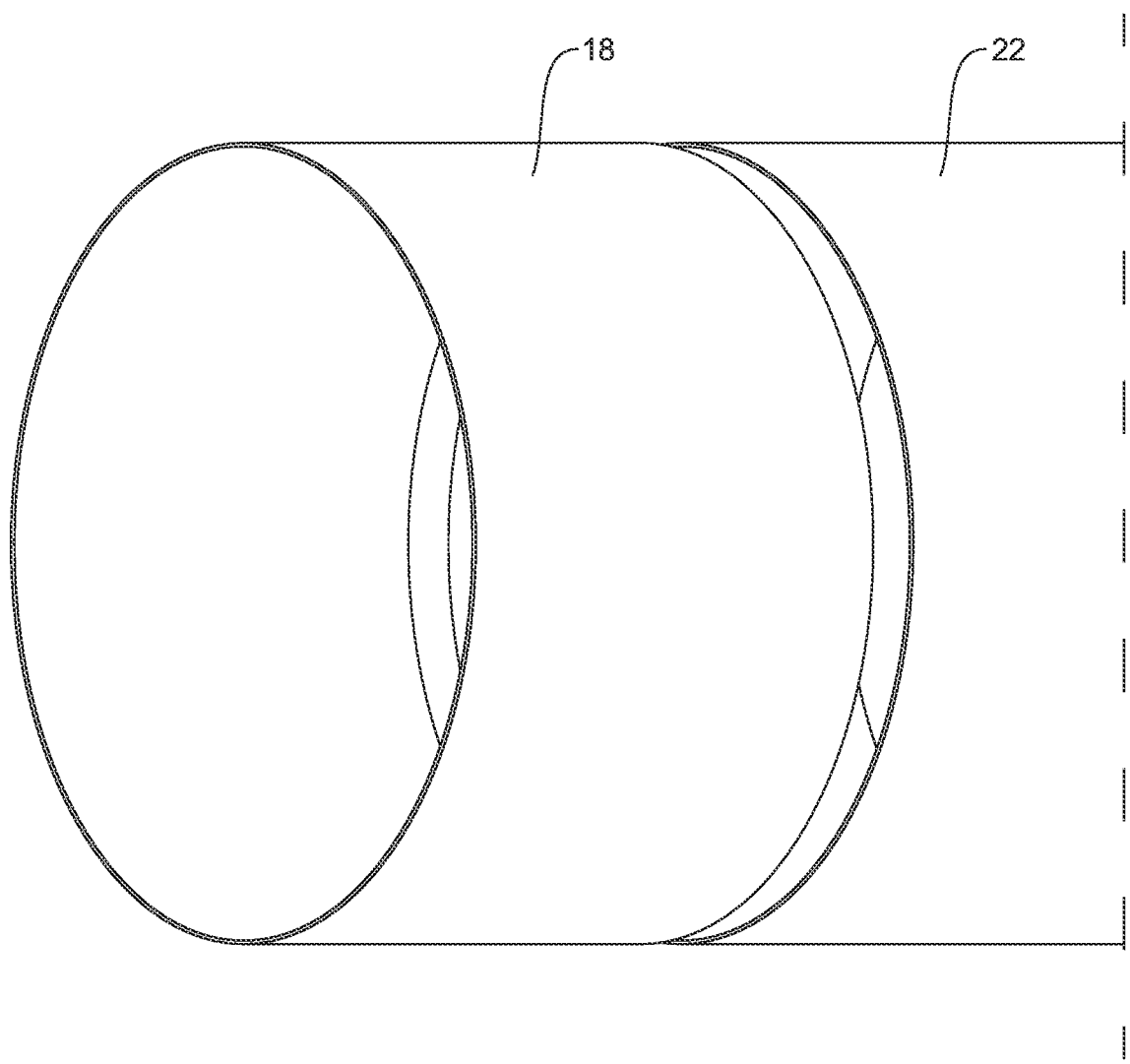
FIG. 3 is one embodiment of a cylindrical sleeve being removed from a cylindrical mandrel.

FIG. 3 is one embodiment of a cylindrical sleeve 18 being removed from the cylindrical mandrel 22.

Similarly, collapsible or dissolvable mandrels may be used. Dissolvable or collapsible mandrels may be used but are generally not needed with the ISC process. PLA (polylactic acid), eutectic salts or any other suitable dissolvable mandrels may be used in cases where extraction is not otherwise possible.

Alternately, a braided, 3D braided, knitted, or other textile process may be used to make an unconsolidated sleeve preform. The sleeve preform may be consolidated using a vacuum bag, shrink wrap tape or other suitable means instead of the ISC process. However, braiding or other textile weaving process will reduce the compression strength of the composite cylinder due to fiber undulations necessitating a thicker laminate.

Figure 4A:
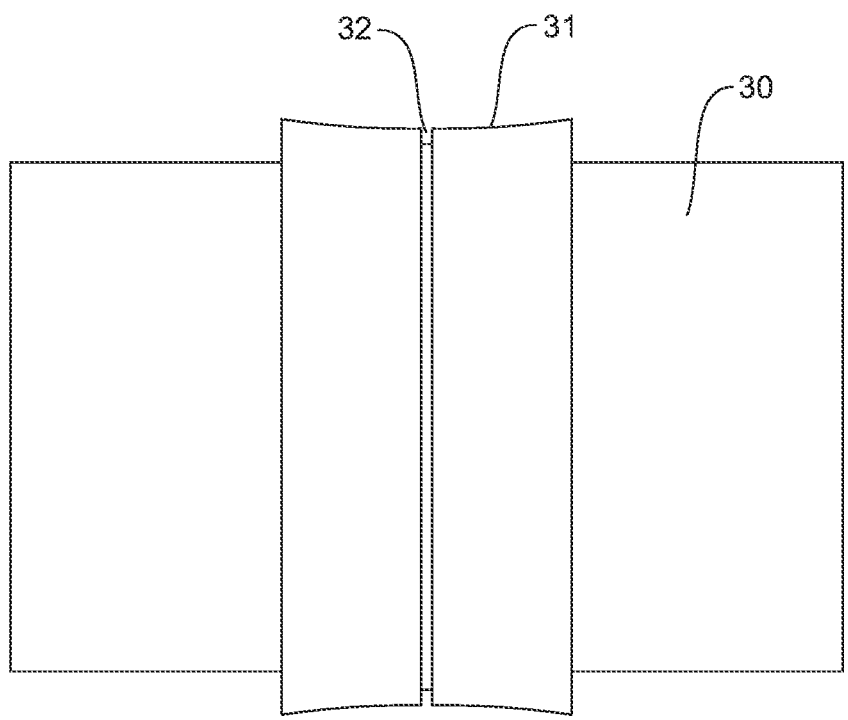
FIG. 4A illustrates a slotted compaction roller.

FIG. 4A illustrates a slotted compaction roller 30. The slotted roller is used to form the axial ribs 40. The slotted roller rolls along the longitudinal direction of the sleeve 18 where the curvature 31 matches the outer diameter of the sleeve. There is an annular gap 32 that forms the axial ribs 40. In other words, the axial ribs 40 on the outer diameter of the stator sleeve 18 are formed using an in-situ process where one melts a neat polymer onto the outer diameter of the sleeve and the roller will form the square cross-sectional profile utilizing the annular gap 32. Heat will be applied to the neat material and the outer diameter of the stator sleeve to melt bond them together. The roller also applies the required compaction force to push the neat material against the sleeve to enable intimate contact for molecular chain entanglement.

Figure 4B:
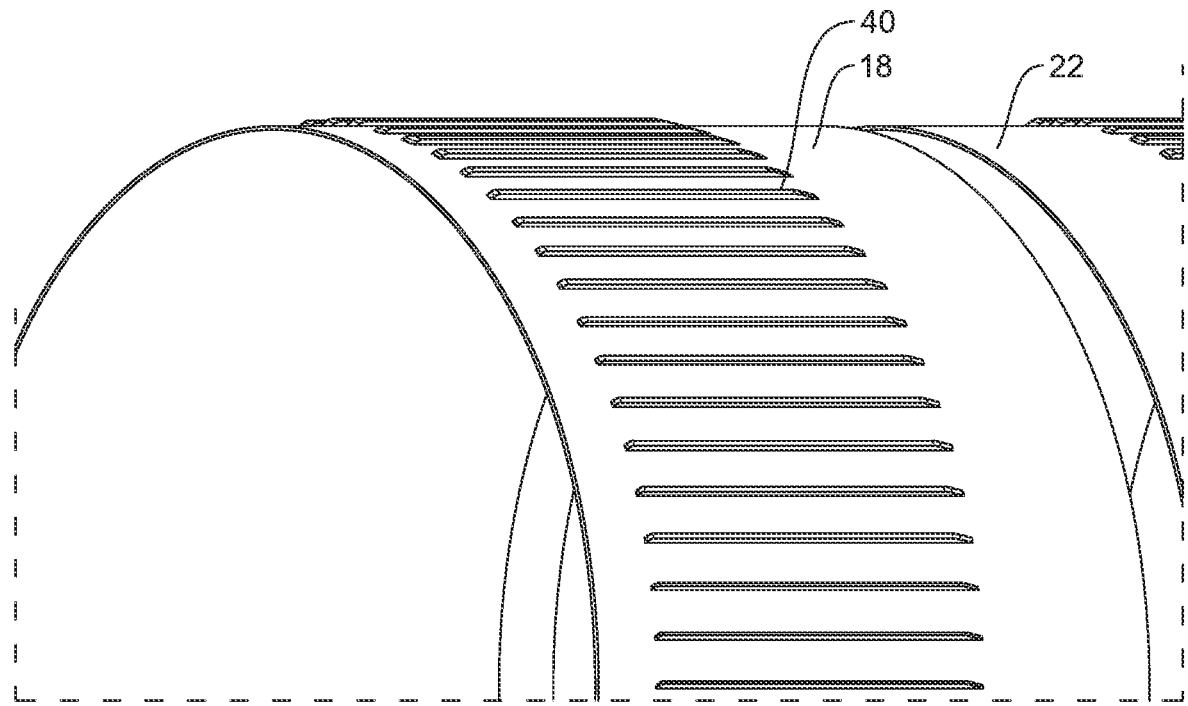
FIG. 4B illustrates axial features added to the stator sleeve.

FIG. 4B illustrates that axial features 40 (such as stator slots) may be added using the slotted or other shape groove in the compaction roller along with additional composite or polymer filament with the ISC process.

Alternately, features can be added using an additive manufacturing process such as Fused Filament Fabrication (FFF). A continuous fiber composite, chopped fiber filled, or neat polymer filament may be used to add these features.

Furthermore, stator slots may be filled with an insulator such as PEEK polymer inserts for electrical insulation. Such slot fillers can be advantageously incorporated into the stator sleeve for the added benefit of greater bending stiffness.

A trimmer operation may be needed to trim each end of the unfinished stator sleeve 18 resulting in a trimmed stator sleeve having a first end 18a opposite a second end 18b.

Figure 5A:
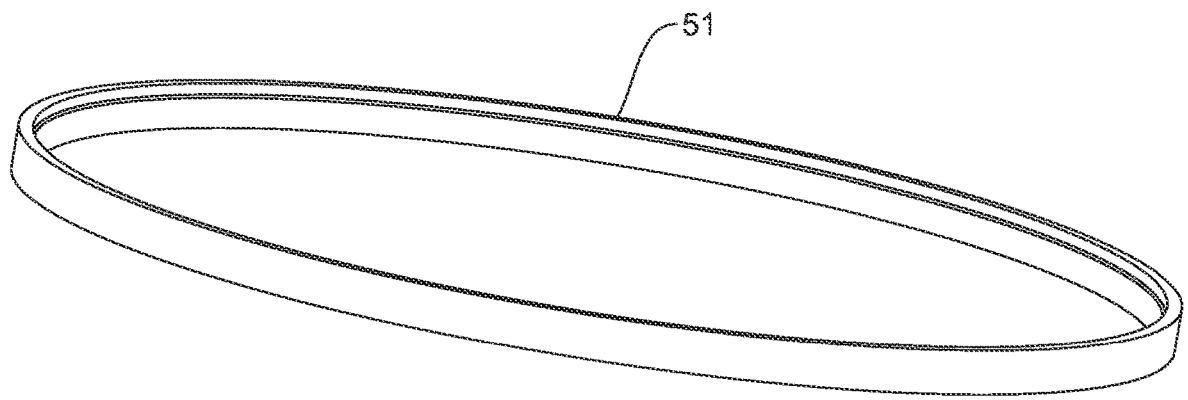
FIG. 5A illustrates a first end ring of the stator sleeve.
Figure 5B:
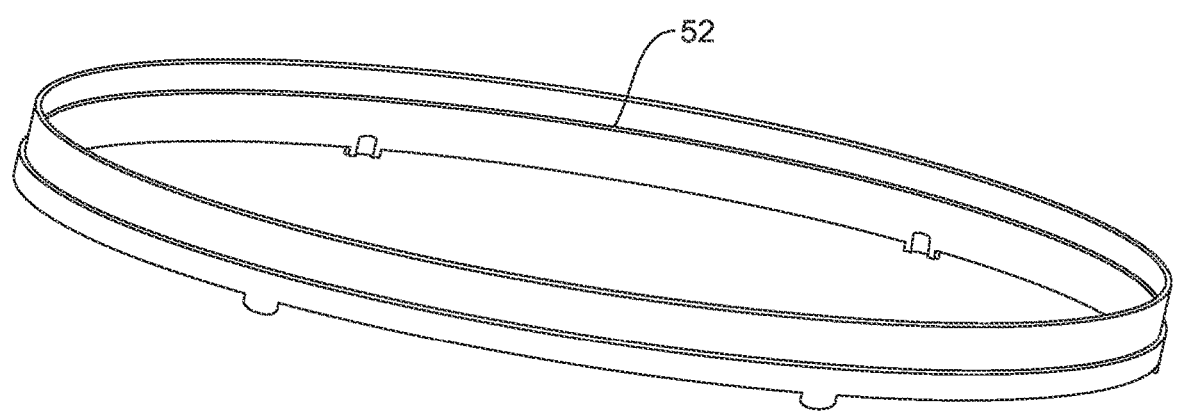
FIG. 5B illustrates a second end ring of the stator sleeve.

To complete a production ready stator sleeve, the ends of the stator have to be configured to work within a particular motor. This means various features and structures are needed along the ends of the stator sleeve. In the present invention, end rings or other features may be added by melt bonding or other means. FIGS. 5A and 5B show two representative end rings 51 and 52 that may be attached to the stator sleeve.

Figure 6A:
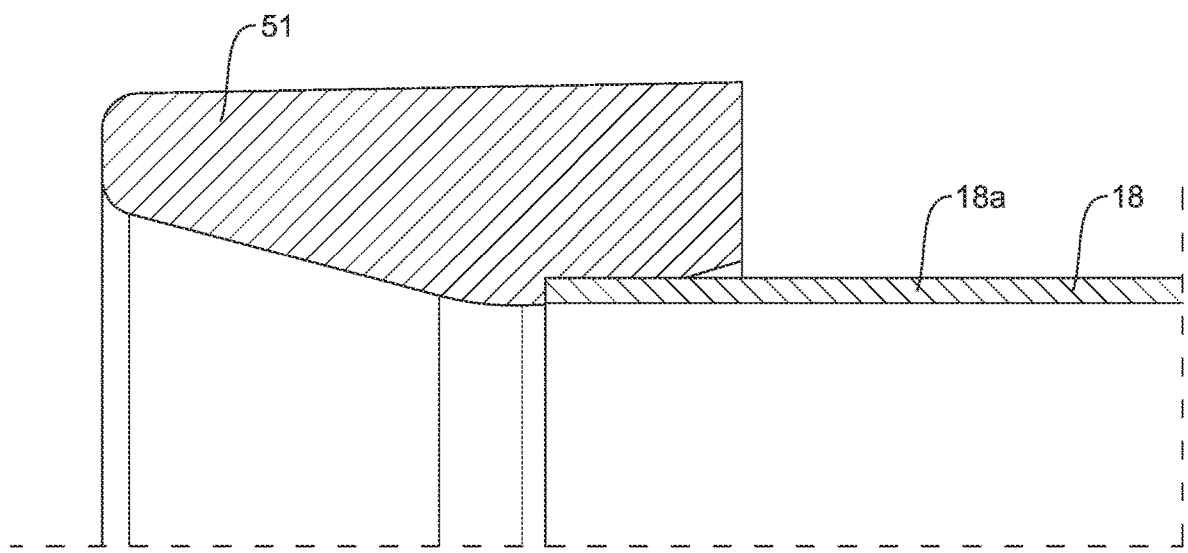
FIG. 6A is an enlarged sectional view showing the structure of FIG. 5A being attached to one end of the stator sleeve.
Figure 6B:
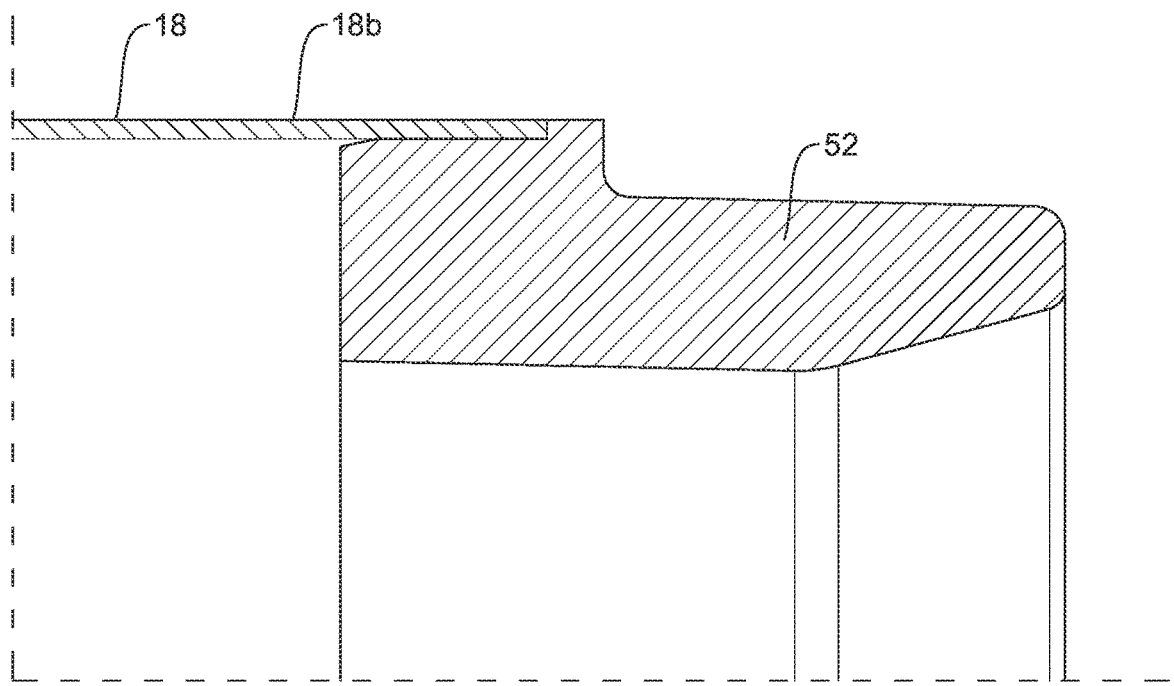
FIG. 6B is an enlarged sectional view showing the structure of FIG. 5B being attached to another end of the stator sleeve.

FIG. 6A is an enlarged sectional view showing the structure (end ring 51) of FIG. 5A being attached to one end 18a of the stator sleeve 18. Likewise, FIG. 6B is an enlarged sectional view showing the structure (end ring 52) of FIG. 5B being attached to the other end 18b of the stator sleeve 18. One can see the overlap of stator sleeve and end fittings.

Figure 7:
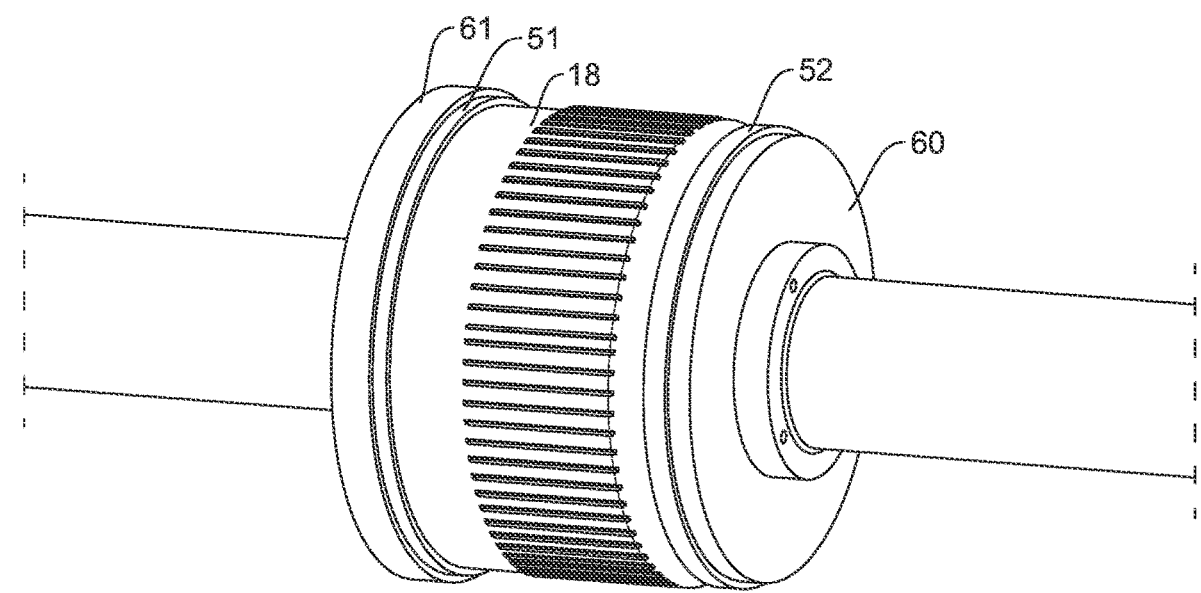
FIG. 7 is an isometric view illustrating the end rings being located in relation to the stator sleeve with the use of a cylindrical fixture tool.

FIG. 7 now shows the end rings 51, 52 being located in relation to the stator sleeve 18 with the use of a cylindrical fixture tool 60. The fixture tool helps align and hold in place the end rings relative to the stator sleeve. For example, the tool 60 has a larger diameter portion 61 that abuts the end ring 51 when the end ring 51 is first slid on. Next, the stator sleeve can be slid on. Finally, the end ring 51 can be slid onto the tool 60. In this manner, all three parts are held together in abutting relationship. Subsequently, the end rings may be bonded to the sleeve using a laser welding machine 70 or other as shown.

Figure 8:
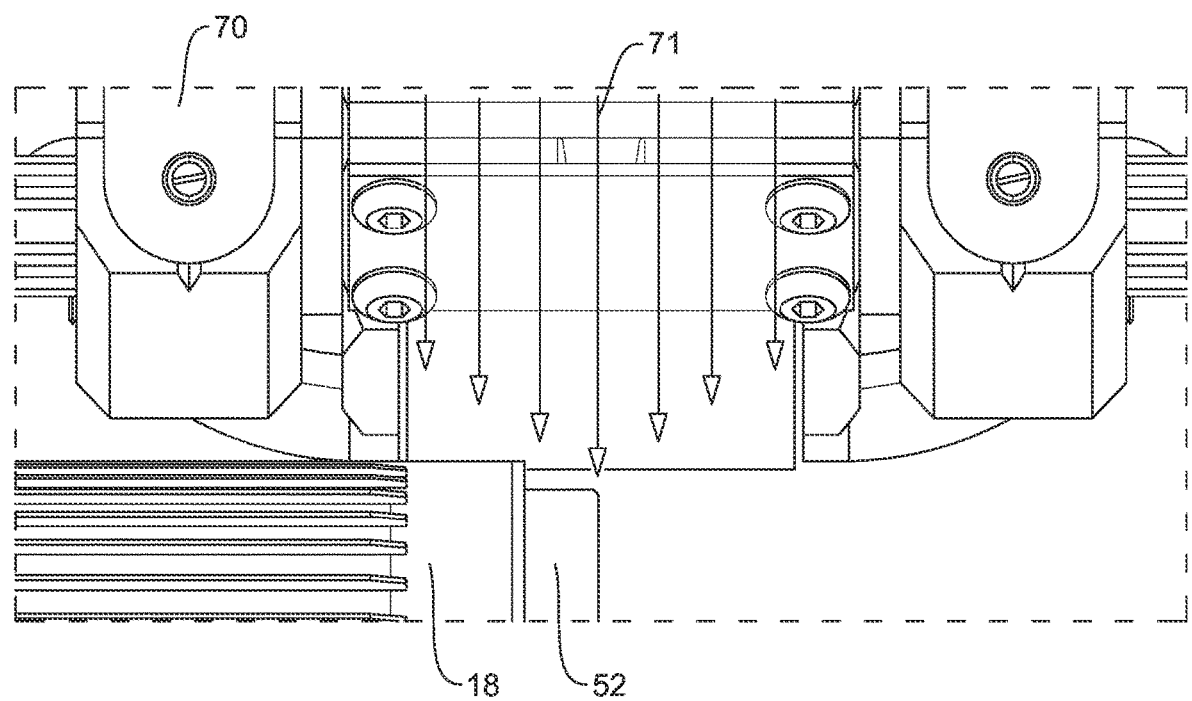
FIG. 8 is a front view of the structure of FIG. 7 now with a laser welding machine imparting laser energy to the end fitting and the stator sleeve.

FIG. 8 is a front view of the structure of FIG. 7 now with a laser welding machine 70 imparting laser energy 71 to the end fitting and the stator sleeve. The laser energy 71 can be seen being imparted onto the stator sleeve 18 and the end ring 52 and permanently connecting them together.

Figure 9:
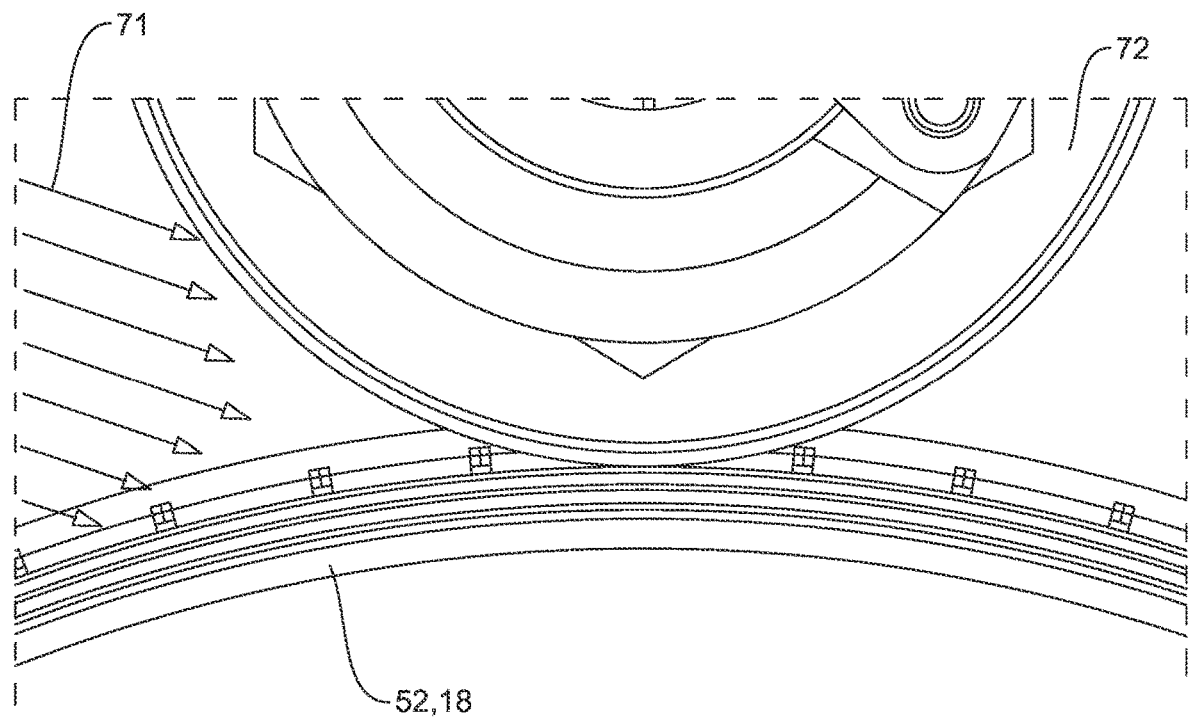
FIG. 9 is a side view of FIG. 8.

FIG. 9 illustrates the side view of laser welding of the end fitting as depicted in FIG. 8. The laser beam 71 is shown being directed towards the end fitting and roller. A roller 72 helps facilitate the connection of the end rings and stator sleeve. The roller applies compaction pressure to the sleeve and the ring. In order to melt bond plastic together one needs to apply both heat and pressure. The laser energy melts the surfaces and the roller applies the pressure needed to bond the two parts together. It is understood by those skilled in the art that other techniques could permanently connect the end rings to the stator sleeve, such as melt bonding or friction welding.

In FIGS. 8 and 9 the stator sleeve would normally have a tan color indicating the natural color of S2/PEEK composites and the end fittings would be darker (such as black) indicating PEEK that is filled with an IR absorbing materials such as carbon black. The S2/PEEK is transparent to the IR laser whereas the carbon black filled PEEK absorbs the IR laser energy thereby heating the carbon black filled PEEK surface that enables melt bonding it to the S2/PEEK sleeve.

Figure 10:
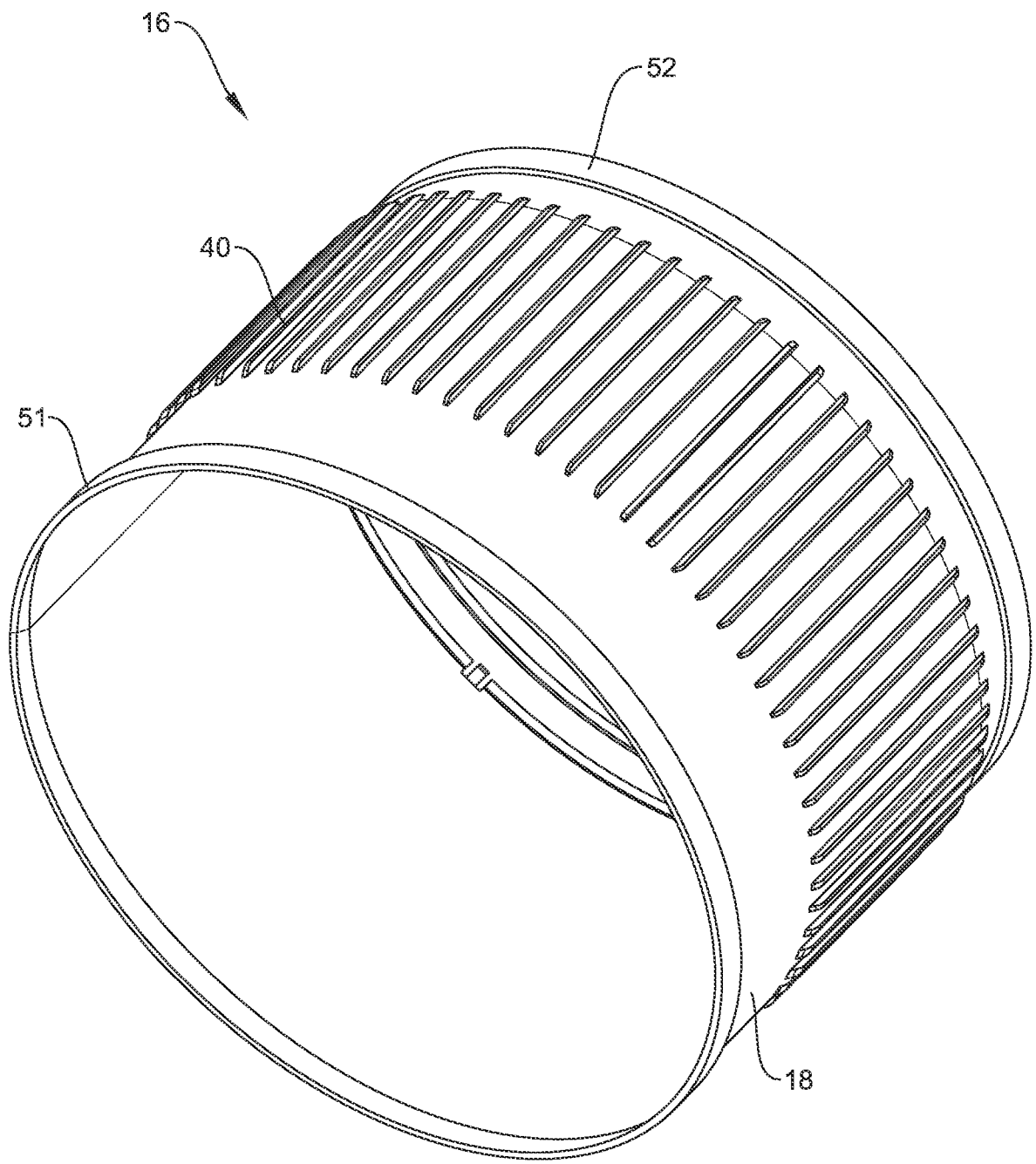
FIG. 10 is an isometric view of a completed stator sleeve of the present invention.

FIG. 10 illustrates the completed stator sleeve assembly 16. One advantage of the present invention is that the polymer used to manufacture the end rings and the polymer used in the polymer matrix of the prepreg can be the same material. This then allows a good connection between the stator sleeve and the end rings whether it is laser welded or melt bonded.

Figure 11:
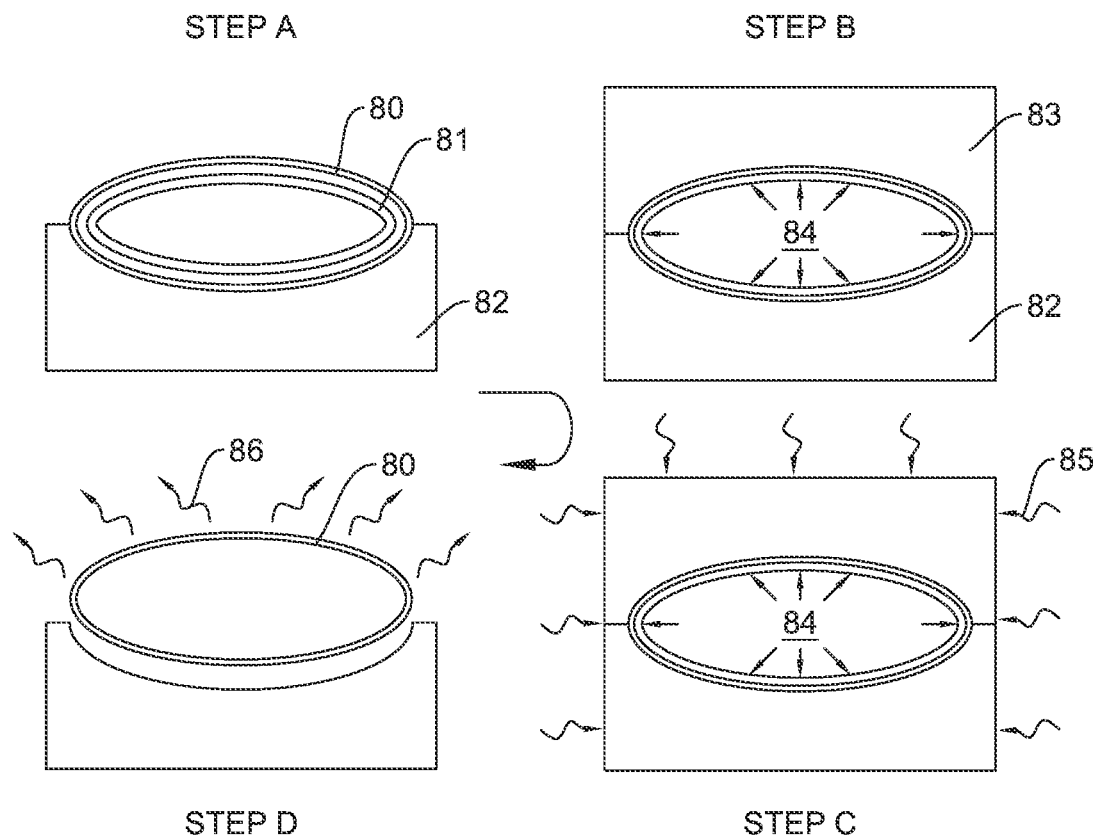
FIG. 11 is a simplistic representation of another novel method of the present invention utilizing bladder molding.

FIG. 11 illustrates an alternative form of manufacturing the stator sleeve of the present invention utilizing bladder molding.

Bladder molding is an alternative consolidation approach. The idea is to start with a composite sleeve 80 that doesn't need to be fully consolidated. Such a sleeve could be partially ISC (in-situ consolidation) or a braided sleeve for example.

The manufacturing process may include the following steps. First, one would fabricate a composite sleeve preform 80. Step A shows inserting a conformable bladder 81 into the composite sleeve 80. Then insert the sleeve and the bladder into a mold 82, 83. Step B shows adding pressurize 84 to the bladder forcing the sleeve to take the shape of the molds 82 and 83. Step C shows heating 85 the assembly to above the polymer melt temperature. This heat would be while being pressurized. Then one would cool 86 the assembly and remove the consolidated part and bladder from the mold as shown in Step D. While FIG. 11 is for illustration only as the shape is simple cavity, it is understood by those skilled in the art that the shape could be a cylinder or any other shape.

Figure 12:
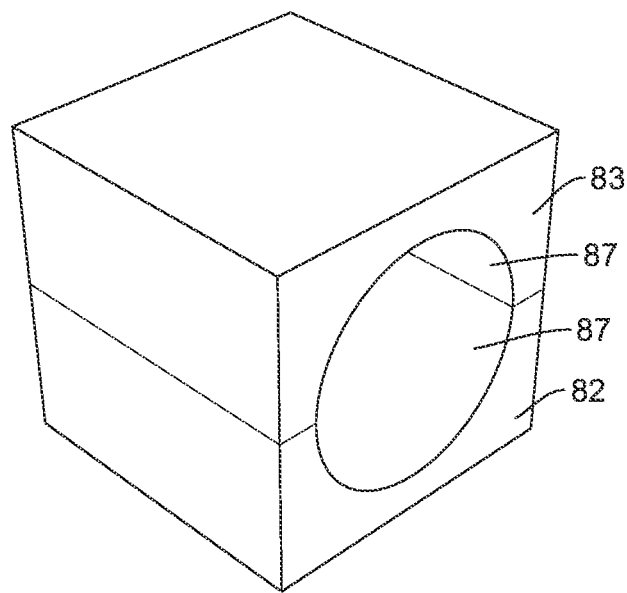
FIG. 12 is a perspective view of a simplistic bladder mold of the present invention.
Figure 13:
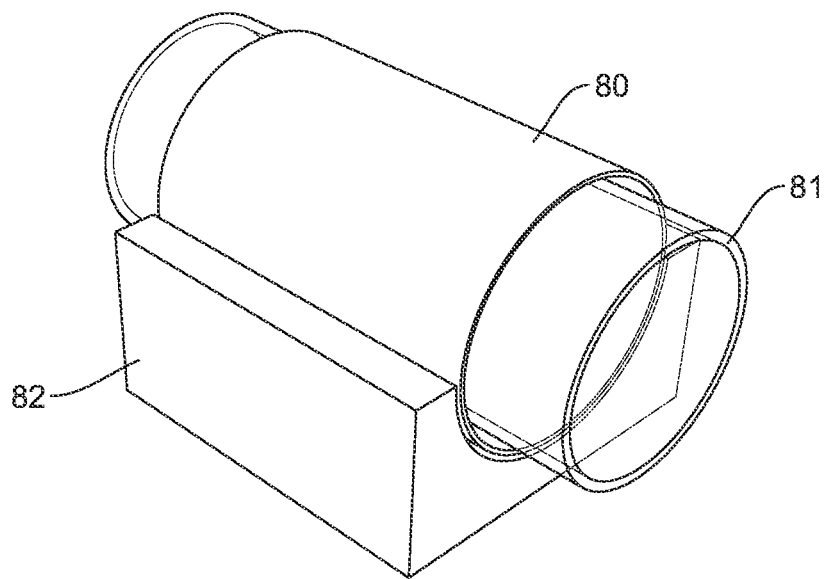
FIG. 13 shows the mold of FIG. 12 now with a sleeve and bladder inserted therein.
Figure 14:
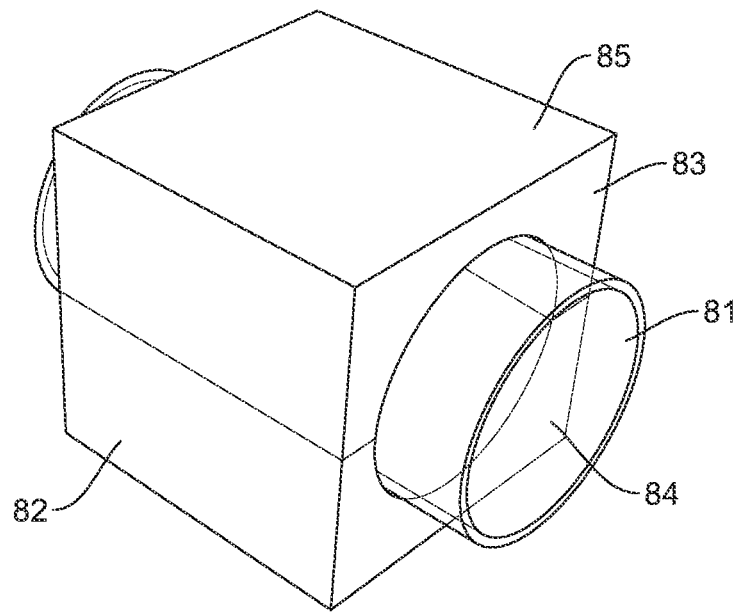
FIG. 14 shows the structure of FIG. 13 with pressure applied to the bladder mold and heat added.
Figure 15:
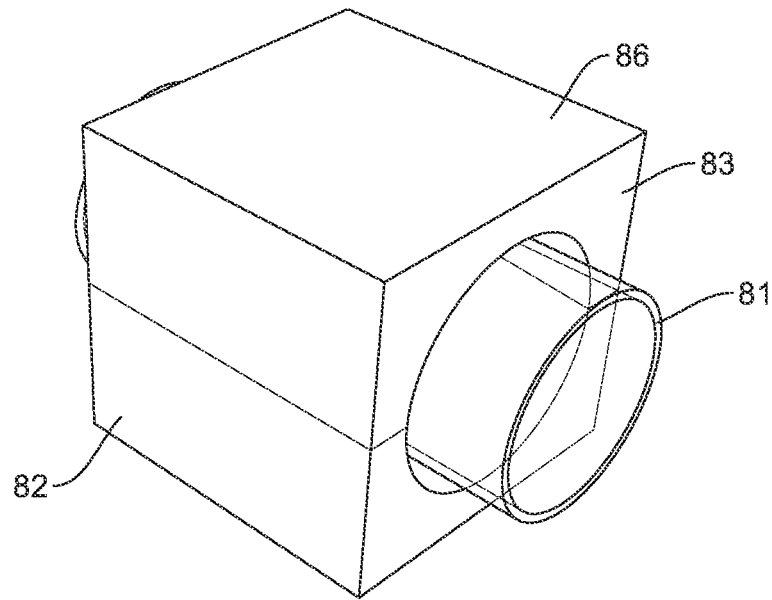
FIG. 15 shows the cooling and depressurization of the structure of FIG. 14.
Figure 16:
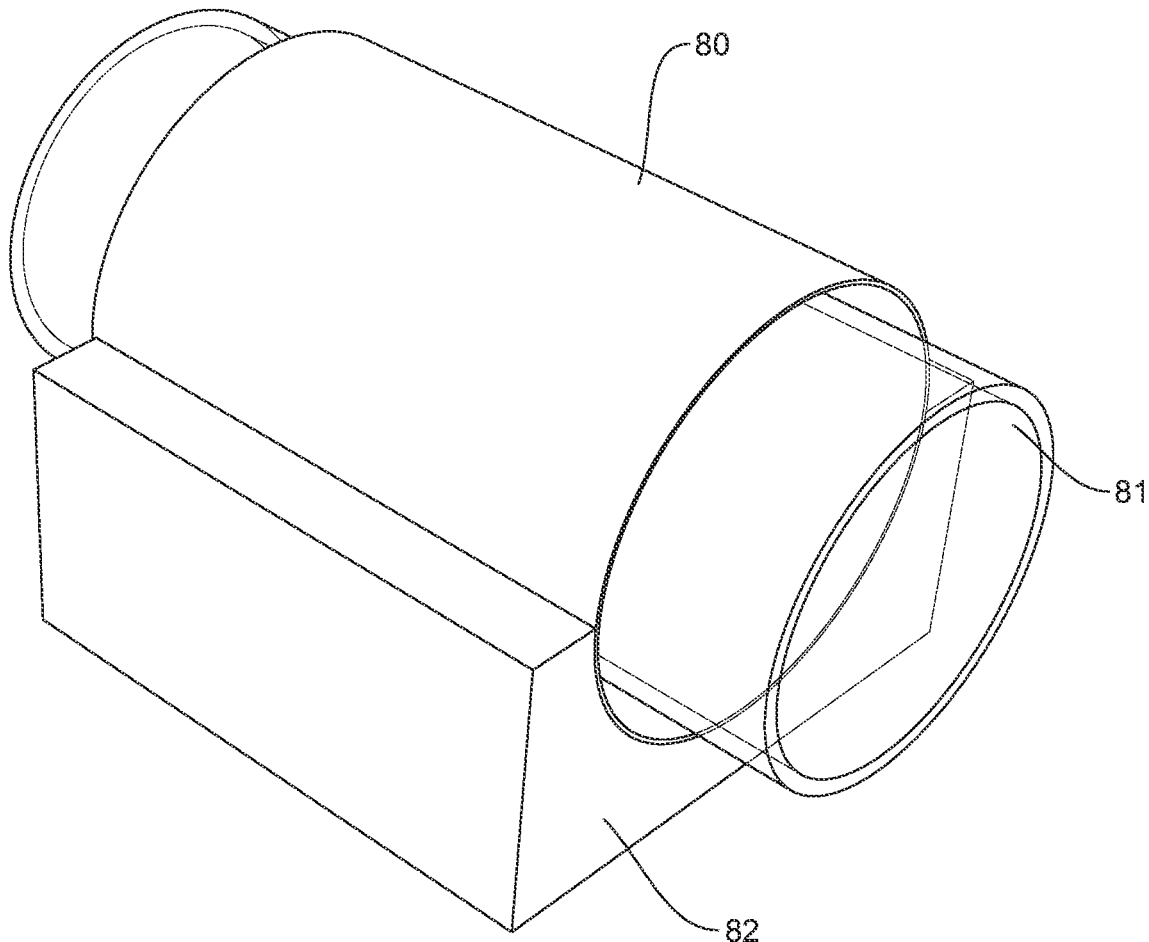
FIG. 16 shows the resulting sleeve that can be trimmed and attached to end rings as previously described herein.

FIGS. 12-16 are perspective views of a better depiction of the process described in FIG. 11. FIG. 12 is a perspective view of a very simple mold 82 and 83. It is a two-part mold but could comprise any number of parts and sections. The inside of the mold defines a surface 87 that eventually defines the outside surface of the sleeve 80 once the pressurization and heating are finished. FIG. 13 illustrates adding the sleeve 80 and inserting the conformable bladder 81 inside the sleeve. FIG. 14 illustrates adding the top mold 83 and then adding pressure 84 to the conformable bladder 81 and adding heat 85. After enough time to finalize the formation of the sleeve, FIG. 15 illustrates that one could cool 86 the assembly and depressurize the bladder 81. FIG. 16 illustrates that the top mold 83 can be removed and then the bladder removed. The sleeve 80 can then be removed. It is understood that the sleeve 80 can then be trimmed and end rings added as previously described.

There are advantages of this approach, which are now described. The internal pressure and resulting expansion tend to remove wrinkles in the fibers thereby improving compressive and tensile strength. The process fully consolidates the laminate, reduce porosity, and eliminate permeation. External features such as ribs, end rings, or other features can be formed provided that excess polymer or filled polymer is available.

The bladder may be made of different materials depending on temperature, expansion, and other factors. The bladder may be made as an elastomer such as silicone, a metal such as aluminum or a higher melt temperature polymer such as polyimide.

The bladder may be energized in different ways. First, the bladder may be energized by internal pressure, such as through pneumatic or pneumatic pressure. Second, the bladder may be energized by an applied force, through the use of various structures, clamps and/or weights. Third, the structure may be energized by utilizing a material of a higher coefficient of thermal expansion (CTE) in comparison to the surrounding structures.

For example, a fiberglass/PA composite cylinder could be bladder molded using a silicone bladder pressurized by air. Alternately, a solid cylinder of silicone could be used in place of the bladder where the high CTE of the silicone (assuming a lower CTE mold such as steel) would apply pressure at the melt temperature of PA. In the case of a fiberglass/PEEK cylinder, the silicone bladder would degrade at the higher temperatures needed to melt the PEEK (>343 C) so a higher temperature bladder such a PI or aluminum would be required. Alternately, a solid cylinder of aluminum could be used in place of the bladder where the high CTE of the aluminum (assuming a lower CTE mold such as steel) would apply pressure at the melt temperature of PEEK.

Although several embodiments have been described in detail for purposes of illustration, various modifications may be made to each without departing from the scope and spirit of the invention. Accordingly, the invention is not to be limited, except as by the appended claims.

NUMERALS

- 10 electric motor
- 11 outside housing
- 12 stator
- 13 winding
- 14 rotor
- 15 rotor sleeve
- 16 stator sleeve
- 17 permanent magnet
- 18 sleeve, stator, before completion
- 20 tape, prepreg
- 21 tape feed roller
- 22 tool, mandrel
- 23 ply, plies
- 24 roller
- 25 force
- 26 direction of travel
- 27 heater, hot gas torch convection heater
- 28 tape cutter
- 30 slotted compaction roller
- 31 curvature
- 32 annular gap
- 40 axial features/ribs, stator sleeve
- 51 end ring, stator sleeve
- 52 end ring, stator sleeve
- 60 cylindrical fixture tool
- 70 laser welding machine
- 71 laser energy
- 72 roller
- 80 composite sleeve preform
- 81 conformable bladder
- 82 mold, bottom 83 mold, top
84 pressure
85 heat
86 cool
87 surface, inside of mold, outside of sleeve

What is claimed is:

1. A method of manufacturing a stator sleeve, the stator sleeve configured to be assembled as part of a cooled electrical motor having a stator with a stationary conductor with winding and a rotor with a rotating permanent magnet, where a coolant liquid is configured to cool the stationary conductor with winding, the method of manufacturing the stator sleeve comprising the steps of:
providing a cylindrical mandrel;
wrapping the cylindrical mandrel with a prepreg tape using automated fiber placement, the automated fiber placement comprising in-situ consolidation;
wherein the prepreg tape comprises a continuous fiber reinforcement within a polymer matrix;
heating the prepreg tape during the automated fiber placement;
cooling the wrapped prepreg tape by waiting an elapsed time;
removing the cylindrical mandrel from the wrapped prepreg tape resulting in an unfinished cylindrically-shaped stator sleeve;
trimming each end of the unfinished stator sleeve resulting in a trimmed stator sleeve having a first end opposite a second end;
providing a first end ring and a second end ring, wherein the first and second end rings comprise a polymer;
wherein the polymer of the first and second end rings is the same material as the polymer matrix of the prepreg tape;
abutting the first and second end rings respectively against the first and second ends of the trimmed stator sleeve using a cylindrical fixture tool; and
laser welding or melt bonding the first and second end rings respectively to the first and second ends of the trimmed stator sleeve, thereby forming a completed stator sleeve configured for installation in the cooled electrical motor.

2. The method of claim 1, wherein the prepreg tape wrapping is in a hoop-wrap orientation.

3. The method of claim 1, wherein the continuous fiber reinforcement comprises glass, carbon and/or boron.

4. The method of claim 1, wherein the polymer matrix comprises PA, PET, PBT, POM, PPS, PEEK, PAEK and/or PEKK.

5. The method of claim 1, wherein the heating of the prepreg tape during the automated fiber placement comprises hot gas torch convection heating, laser heating, flash lamp heating or infrared heating.

6. The method of claim 1, where the first and second end rings comprise a carbon black filled polymer.

7. The method of claim 1, wherein the stator sleeve is impermeable to the coolant liquid.

8. The method of claim 1, wherein the prepreg tape is unidirectional.

9. The method of claim 1, wherein the step of removing the cylindrical mandrel from the wrapped prepreg tape comprises cooling the cylindrical mandrel so as to contract and shrink in size.

10. The method of claim 9, wherein the cooling of the cylindrical mandrel comprises flowing a cooled liquid through the cylindrical mandrel.

11. The method of claim 1, wherein the step of removing the cylindrical mandrel from the wrapped prepreg tape comprises dissolving the cylindrical mandrel in a liquid configured to dissolve the material of the cylindrical mandrel.

12. The method of claim 1, wherein the step of removing the cylindrical mandrel from the wrapped prepreg tape comprises collapsing the cylindrical mandrel.

13. A method of manufacturing a stator sleeve, the stator sleeve configured to be assembled as part of a cooled electrical motor having a stator with a stationary conductor with winding and a rotor with a rotating permanent magnet, where a coolant liquid is configured to cool the stationary conductor with winding, the method of manufacturing the stator sleeve comprising the steps of:
providing a cylindrical mandrel;
wrapping the cylindrical mandrel with a prepreg tape using automated fiber placement, the automated fiber placement comprising in-situ consolidation;
wherein the prepreg tape comprises a continuous fiber reinforcement within a polymer matrix;
wherein the prepreg tape wrapping is in a hoop-wrap orientation;
wherein the continuous fiber reinforcement comprises glass, carbon and/or boron;
wherein the polymer matrix comprises PA, PET, PBT, POM, PPS, PEEK, PAEK and/or PEKK;
heating the prepreg tape during the automated fiber placement, wherein the heating comprises hot gas torch convection heating, laser heating, flash lamp heating or infrared heating;
cooling the wrapped prepreg tape by waiting an elapsed time;
removing the cylindrical mandrel from the wrapped prepreg tape resulting in an unfinished cylindrically shaped stator sleeve;
trimming each end of the unfinished stator sleeve resulting in a trimmed stator sleeve having a first end opposite a second end;
providing a first end ring and a second end ring, wherein the first and second end rings comprise a carbon black filled polymer;
wherein the polymer of the first and second end rings is the same material as the polymer matrix of the prepreg tape;
abutting the first and second end rings respectively against the first and second ends of the trimmed stator sleeve using a cylindrical fixture tool; and
laser welding or melt bonding the first and second end rings respectively to the first and second ends of the trimmed stator sleeve, thereby forming a completed stator sleeve configured for installation in the cooled electrical motor.

14. A method of manufacturing a stator sleeve, the stator sleeve configured to be assembled as part of a cooled electrical motor having a stator with a stationary conductor with winding and a rotor with a rotating permanent magnet, where a coolant liquid is configured to cool the stationary conductor with winding, the method of manufacturing the stator sleeve comprising the steps of:
providing a cylindrical mandrel;
wrapping the cylindrical mandrel with a prepreg tape using automated fiber placement;
wherein the prepreg tape comprises a continuous fiber reinforcement within a polymer matrix;
heating the prepreg tape during the automated fiber placement;

cooling the wrapped prepreg tape by waiting an elapsed time;

removing the cylindrical mandrel from the wrapped prepreg tape resulting in an unfinished cylindrically shaped stator sleeve;

wherein the unfinished cylindrically shaped stator sleeve is not fully consolidated;

providing an outer mold defining an outside surface corresponding to an intended shape of a finished stator sleeve;

placing the unfinished cylindrically shaped stator sleeve into the outer mold;

inserting a conformable bladder into the unfinished cylindrically shaped stator sleeve;

pressurizing the conformable bladder;

heating an assembly, the assembly comprising the outer mold, the unfinished cylindrically shaped stator sleeve and the conformable bladder, wherein the unfinished stator sleeve is fully consolidated by the heating and pressurizing resulting in an unfinished stator sleeve;

cooling the assembly;

removing the unfinished stator sleeve from the outer mold and removing the conformable bladder from the unfinished stator sleeve;

trimming each end of the unfinished stator sleeve resulting in a trimmed stator sleeve having a first end opposite a second end;

providing a first end ring and a second end ring, wherein the first and second end rings comprise a polymer;

wherein the polymer of the first and second end rings is the same material as the polymer matrix of the prepreg tape;

abutting the first and second end rings respectively against the first and second ends of the trimmed stator sleeve using a cylindrical fixture tool; and laser welding or melt bonding the first and second end rings respectively to the first and second ends of the trimmed stator sleeve, thereby forming a completed stator sleeve configured for installation in the cooled electrical motor.

15. The method of claim 14, wherein the prepreg tape wrapping is in a hoop-wrap orientation.

16. The method of claim 14, wherein the continuous fiber reinforcement comprises glass, carbon and/or boron.

17. The method of claim 14, wherein the polymer matrix comprises PA, PET, PBT, POM, PPS, PEEK, PAEK and/or PEKK.

18. The method of claim 14, wherein the heating of the prepreg tape during the automated fiber placement comprises hot gas torch convection heating, laser heating, flash lamp heating or infrared heating.

19. The method of claim 14, where the first and second end rings comprise a carbon black filled polymer.

* * * * *